United States Patent [19]
Hsu

[11] Patent Number: 5,553,447
[45] Date of Patent: Sep. 10, 1996

[54] COUPLER OF A RAKE

[76] Inventor: Shih-Hao Hsu, No. 426, Dou Yuen East Road, Her Fong Village, Bi Tou Hsiang, Chang Hua Hsien, Taiwan

[21] Appl. No.: 489,556

[22] Filed: Jun. 12, 1995

[51] Int. Cl.⁶ .................................. A01D 7/04; F16B 7/10
[52] U.S. Cl. ................................... 56/400.18; 56/400.19; 403/109; 403/327
[58] Field of Search .......................... 56/400.17, 400.01, 56/400.04, 400.18, 400.19, 400.1, 400.08; 403/104, 109, 327

[56] References Cited

U.S. PATENT DOCUMENTS

| | | | |
|---|---|---|---|
| 4,367,971 | 1/1983 | Coren | 403/104 X |
| 4,761,092 | 8/1988 | Nakatani | 403/109 X |
| 5,185,992 | 2/1993 | Garcia | 56/400.04 |

*Primary Examiner*—Terry Lee Melius
*Attorney, Agent, or Firm*—Charles E. Baxley, Esq.

[57] ABSTRACT

A rake includes a tube having a bore for engaging with a handle and having a puncture intersected with the bore. A number of tines are secured to the tube. A plate is engaged in the puncture, has an opening for engaging with the handle, and includes a knob. A spring may bias the plate to engage with the handle so as to secure the handle to the tube. The handle is disengaged from the plate when the plate is moved against the spring by the knob such that the handle may be easily adjusted to suitable position relative to the tube.

2 Claims, 3 Drawing Sheets

COUPLER OF A RAKE

BACKGROUND OF THE INVENTION

1. Field of the Invention

The present invention relates to a rake, and more particularly to a coupler of a rake.

2. Description of the Prior Art

Typical rakes comprise a rake body having a number of tines and comprise a handle secured to the rake body. The handle is solidly secured to the rake body and may not be adjusted relative to the rake body.

The present invention has arisen to mitigate and/or obviate the afore-described disadvantages of the conventional rakes.

SUMMARY OF THE INVENTION

The primary objective of the present invention is to provide a rake having a securing means for adjustably coupling the coupler to the handle.

In accordance with one aspect of the invention, there is provided a rake comprising a tube including a bore formed therein and including a first end having a puncture formed therein, a handle slidably engaged in the tube, a rake body secured to the tube, a plate engaged in the puncture of the tube and including an opening formed therein for engaging with the handle, the plate including a knob means provided thereon, and means for biasing the plate to engage with the handle so as to secure the handle to the tube. The handle is disengaged from the plate when the plate is moved against the biasing means by the knob means, such that the handle may be easily adjusted to suitable position relative to the tube.

A guide is slidably engaged on the middle portion of the tines, the handle includes a first end secured to the guide for moving the guide toward or away from the tube.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
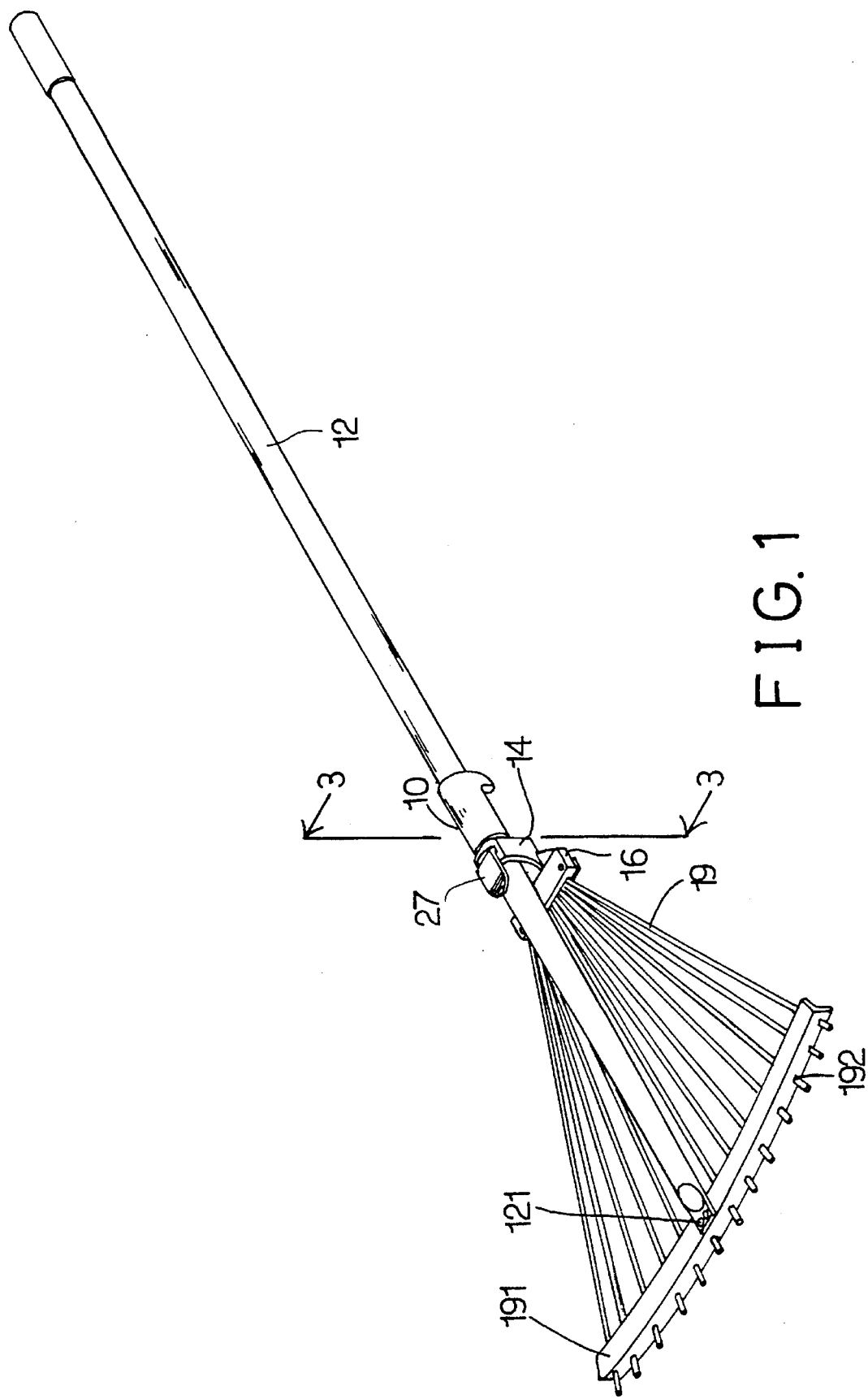
FIG. 1 is a perspective view of a rake in accordance with the present invention.
Figure 2:
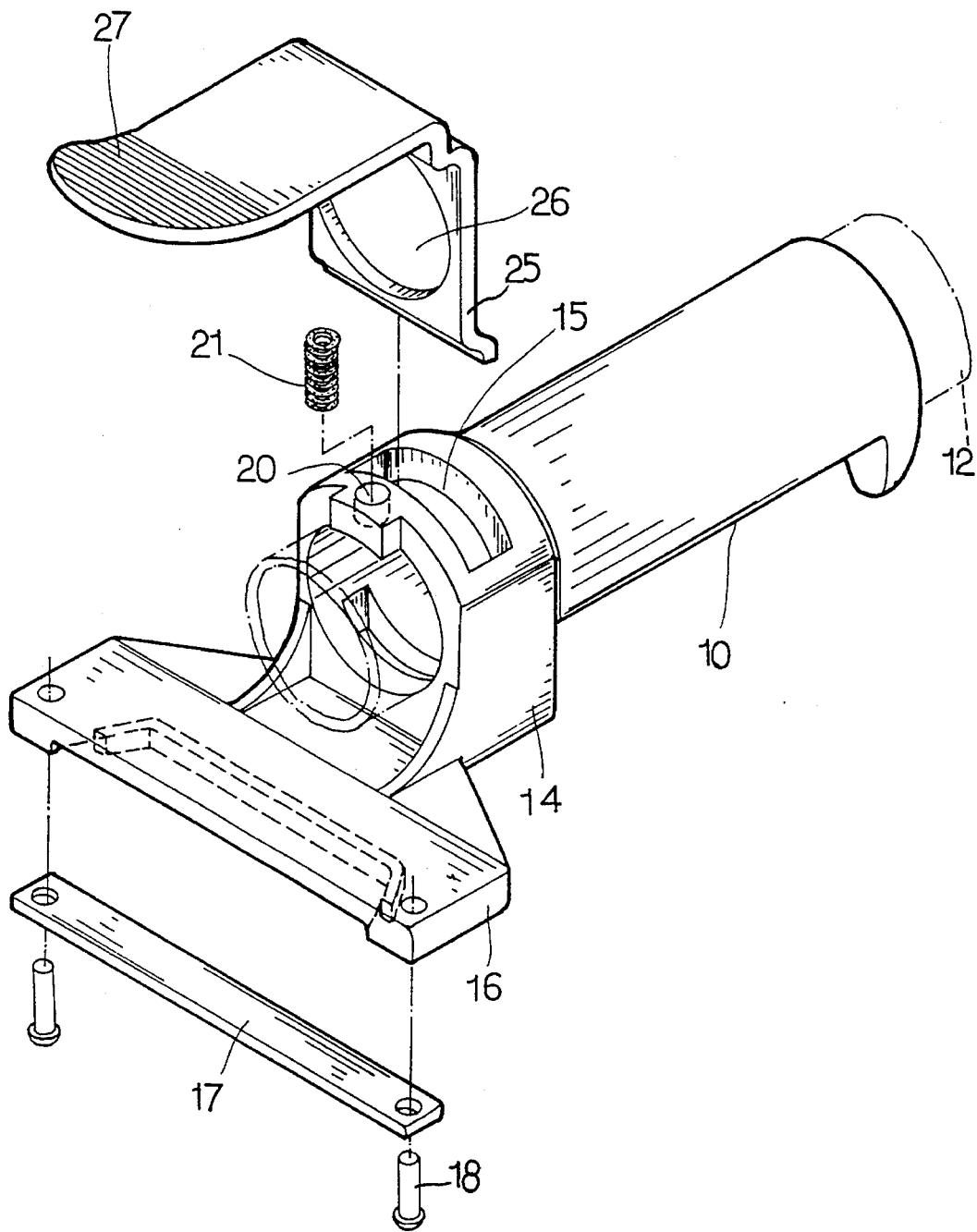
FIG. 2 is a partial exploded view of the coupler of the rake.
Figure 3:
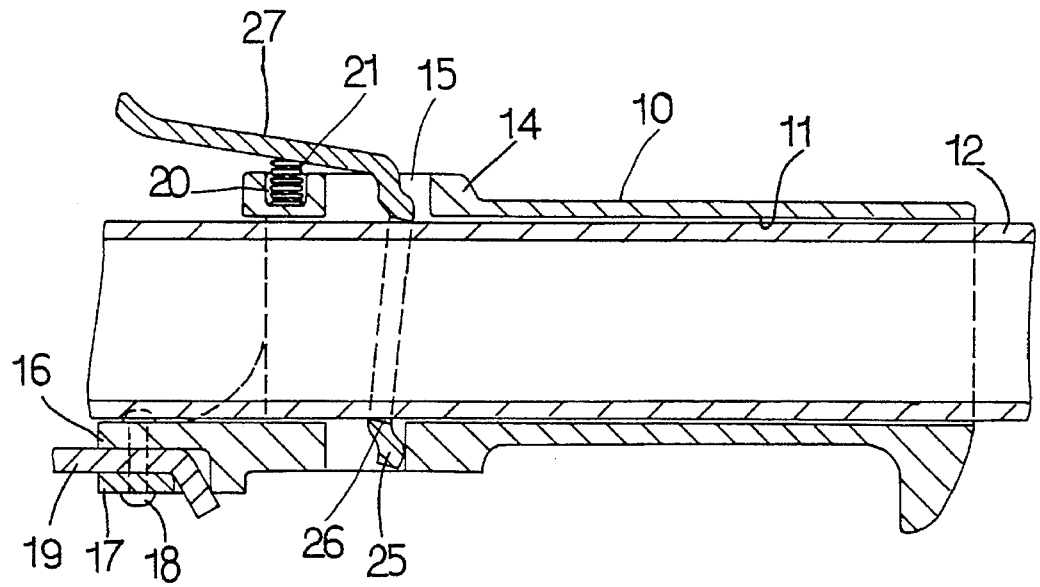
FIGS. 3 and 4 are cross sectional views taken along lines 3—3 of FIG. 1.
Figure 4:
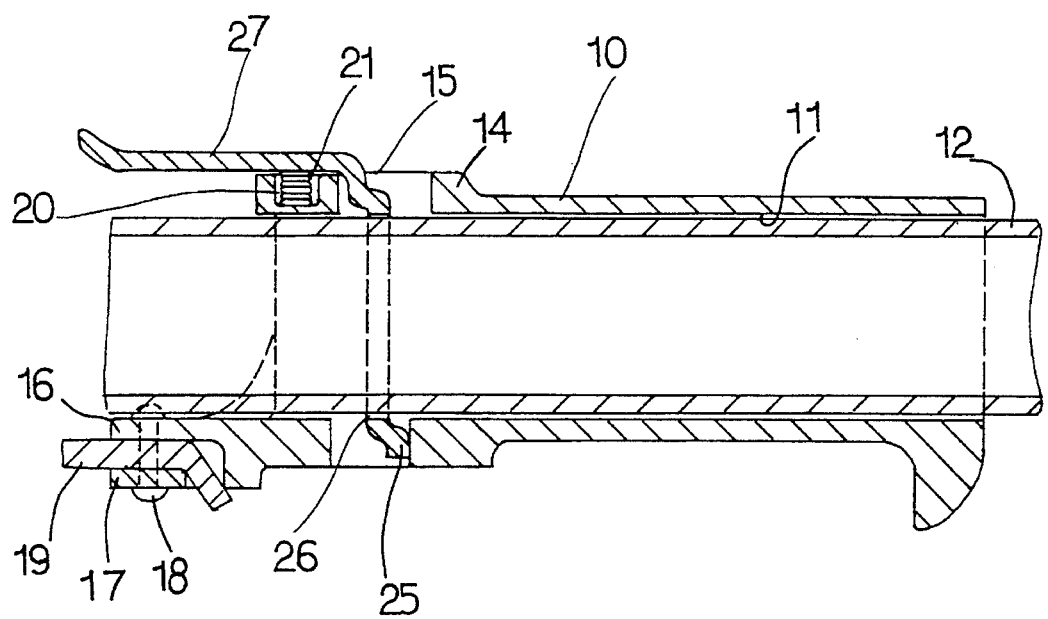

Referring to the drawings, and initially to FIGS. 1 to 3, a rake in accordance with the present invention comprises a tube 10 including a bore 11 formed therein for engaging with a handle 12. The tube 10 includes one end 14 having a puncture 15 formed therein and having a panel 16 extended from the bottom portion thereof. A bar 17 is secured to the panel 16 by fastening members 18 so as to secure a number of tines 19 between the panel 16 and the bar 17. The tines 19 include one end secured between the panel 16 and bar 17 includes a middle portion slidably engaged in the holes 192 of a guide 191. The guide 191 may move toward or away from the tube 10 so as to expand or retract the free ends of the tines 19. The handle 12 includes one end secured to the guide 191 for moving the guide 191 relative to the tines 19. The tube 10 includes a cavity 20 formed in the upper portion of the end 14 for engaging with a spring 21. A plate 25 is engaged in the puncture 15 of the tube and is perpendicular to the handle 12. The plate 25 includes an opening 26 formed therein for engaging with the handle 12 and includes a knob 27 extended therefrom and engaged with the spring 21 for operating the plate 25. The opening 26 has a diameter slightly larger than the outer diameter of the handle 12 so as to allow the insertion of the handle 12 through the opening 26.

In operation, as shown in FIG. 3, the plate 25 is biased by the spring 21 to an inclined position relative to the handle 12 such that the plate 25 may be forced to engage with the handle 12 so as to secure the handle 12 to the tube 20. When the knob 27 is depressed against the spring 21 until the plate 25 is perpendicular to the handle 12, the plate 25 is not engaged with the handle 12 such that the handle 12 may be moved relative to the plate 25. When the knob 27 is released, the plate 25 is biased to engage with the handle 12 so as to secure the handle 12 to the tube 20 such that the handle 12 may be easily adjusted relative to the tube 20.

Accordingly, the rake in accordance with the present invention includes a handle that may be adjusted relative to the tube and may be solidly secured to the tube by the plate.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rake comprising:

a tube including a bore formed therein and including a first end having a puncture formed therein, a handle slidably engaged in said tube, a plurality of tines including a first end secured to said first end of said tube and including a middle portion and a second end, a plate engaged in said puncture of said tube and including an opening formed therein and defined by a peripheral edge, said handle being inserted through said opening and selectively engageable with said peripheral edge of said opening, said plate including a knob means provided thereon for moving said plate relative to said handle, and means for biasing said plate to engage with said handle so as to secure said handle to said tube, said handle being disengaged from said plate when said plate is moved against said biasing means by said knob means.

2. A rake according to claim 1 further comprising a guide slidably engaged on said middle portion of said tines, said handle including a first end secured to said guide for moving said guide toward or away from said tube.

* * * * *